(12) United States Patent
Nair

(10) Patent No.: US 7,769,596 B1
(45) Date of Patent: Aug. 3, 2010

(54) INTELLIGENT SERVICE TRAFFIC MANAGEMENT

(75) Inventor: Sunil Ponnangath Nair, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 13 days.

(21) Appl. No.: 12/104,420

(22) Filed: Apr. 16, 2008

(51) Int. Cl.
*G06Q 10/00* (2006.01)
(52) U.S. Cl. ........................................ 705/1.1
(58) Field of Classification Search .............. 705/1
See application file for complete search history.

(56) References Cited

U.S. PATENT DOCUMENTS

| | | | | |
|---|---|---|---|---|
| 6,882,269 B2 * | 4/2005 | Moreno | ................. | 340/5.73 |
| 6,962,531 B2 * | 11/2005 | Pace et al. | ................. | 463/42 |
| 6,999,990 B1 * | 2/2006 | Sullivan et al. | ............. | 709/205 |
| 7,254,572 B2 * | 8/2007 | Cysz et al. | ................. | 707/3 |
| 7,532,899 B2 * | 5/2009 | Wilson et al. | ............. | 455/456.3 |
| 2004/0111315 A1 * | 6/2004 | Sharma et al. | ............. | 705/11 |
| 2005/0221806 A1 * | 10/2005 | Sengupta et al. | ......... | 455/414.3 |
| 2007/0198368 A1 * | 8/2007 | Kannan et al. | ............. | 705/26 |
| 2009/0055208 A1 * | 2/2009 | Kaiser | ....................... | 705/1 |
| 2009/0104920 A1 * | 4/2009 | Moon et al. | ............. | 455/456.3 |

* cited by examiner

*Primary Examiner*—John G Weiss
*Assistant Examiner*—Sangeeta Bahl

(57) ABSTRACT

Computer implemented methods and systems are provided for intelligent service traffic management. A request is received from a mobile device for mobile device service. A location of the mobile device is determined. One or more retail service centers is identified based on the location of the mobile device. A wait for the mobile device service is estimated at each of the retail service centers. The estimated wait and each location of the retail service centers are provided to the mobile device.

19 Claims, 6 Drawing Sheets

| Retail Service Center Location 202 | Estimated Travel Time 204 | Estimated Wait Time 206 | Estimated Time Until Service 208 | Estimated Service Time 210 | Estimated Return Time 212 |
|---|---|---|---|---|---|
| 100 Main Street | 15 minutes | 5 minutes | 20 minutes | 65 minutes | 85 minutes |
| 200 Park Row | 5 minutes | 30 minutes | 35 minutes | 65 minutes | 100 minutes |
| 600 Oak Ave. | 45 minutes | 5 minutes | 50 minutes | 65 minutes | 115 minutes |

| Retail Service Center Location 202 | Estimated Travel Time 204 | Estimated Wait Time 206 | Estimated Time Until Service 208 | Estimated Service Time 210 | Estimated Return Time 212 |
|---|---|---|---|---|---|
| 100 Main Street | 15 minutes | 5 minutes | 20 minutes | 65 minutes | 85 minutes |
| 200 Park Row | 5 minutes | 30 minutes | 35 minutes | 65 minutes | 100 minutes |
| 600 Oak Ave. | 45 minutes | 5 minutes | 50 minutes | 65 minutes | 115 minutes |

200

214
216
218

300

INTELLIGENT SERVICE TRAFFIC MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile device users may not know where to go when they need update or repair service on their mobile devices. Even if a mobile device user may be familiar with a specific retail service center, the mobile device user may not know whether the specific retail service center provides the type of service needed for the user's mobile device.

SUMMARY

The present disclosure provides computer implemented methods and systems for intelligent service traffic management. A request is received from a mobile device for mobile device service. A location of the mobile device is determined. One or more retail service centers is identified based on the location of the mobile device. A wait for the mobile device service is estimated at each of the retail service centers. The estimated wait and each location of the retail service centers are provided to the mobile device.

Some system embodiments include a server and a plurality of service center computers, wherein each of the service centers computers is associated with one or more retail service centers. The server receives a request from a mobile device for mobile device service and determines a location of the mobile device. The server also identifies one or more retail service centers based on the location of the mobile device, and communicates with the service center computers to estimate a wait for the mobile device service at each of the retail service centers. Additionally, the server provides the estimated wait and each location of the retail service centers to the mobile device.

In some other method embodiments, a request is received from a mobile device for mobile device service. A location of the mobile device is determined. A type of mobile device service is determined. One or more retail service centers that provide the type of mobile device service is identified based on the location of the mobile device. A wait for the type of mobile device service is estimated at each of the retail service centers. The estimated wait and each location of the retail service centers are provided to the mobile device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
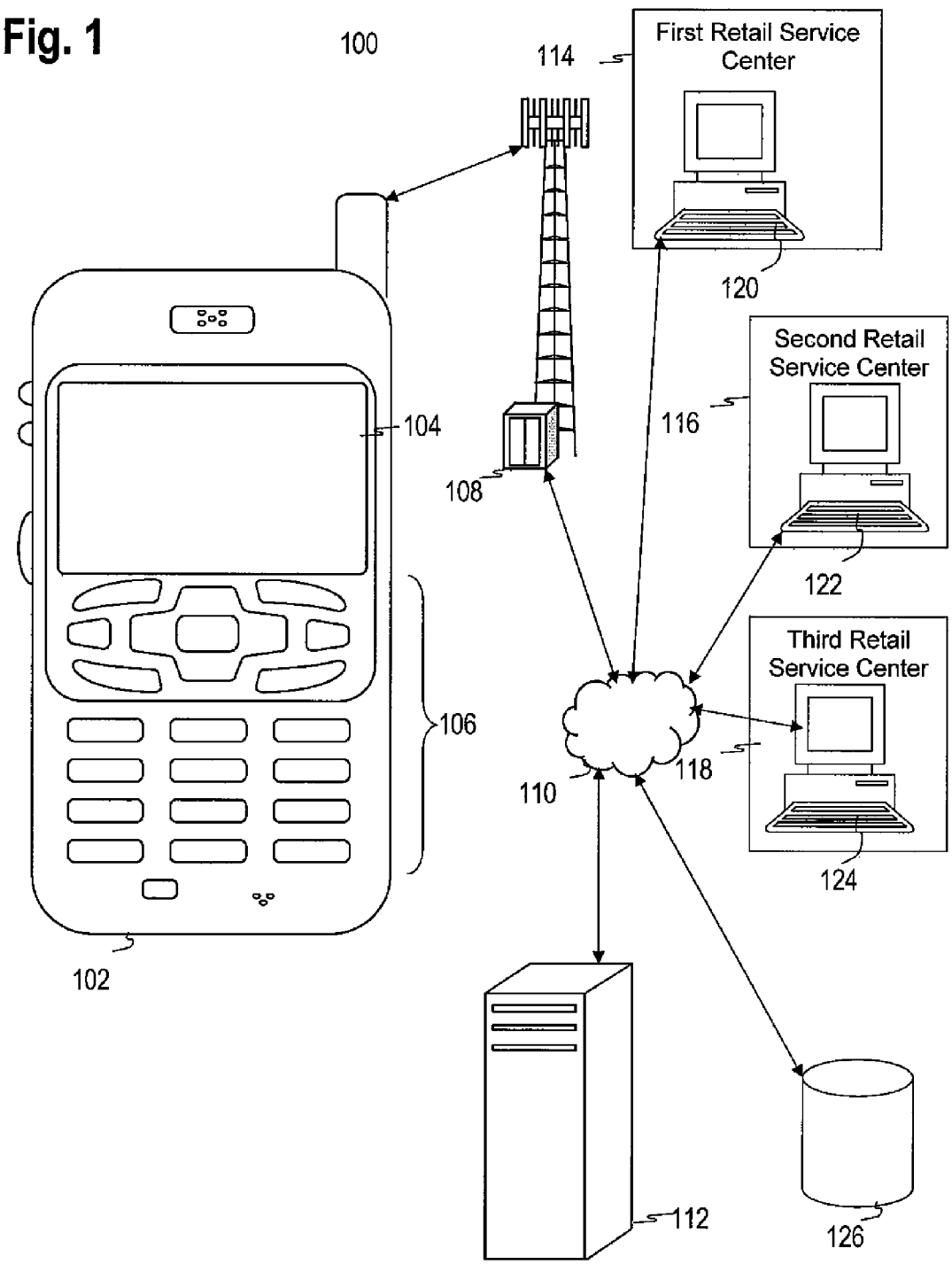
FIG. 1 shows a wireless communications system for intelligent service traffic management according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Mobile device users occasionally have a need to visit a retail service center to obtain updates or repair services on their mobile devices. In addition to physical repairs, examples of updates include a service plan change, a changed mobile device, and an upgraded mobile device. It may be helpful for a mobile device user to be able to use the mobile device to locate the service centers closest to the user's current location. In addition to the location of the service centers, the user may also appreciate receiving confirmation that such updates and repair services are available at the nearby locations and an estimate of the waiting time to obtain the services.

The present disclosure provides computer implemented methods and systems for intelligent service traffic management. When a request is received from a mobile device for mobile device service, for example for a repair, a server determines the location of the mobile device. The server may also determine the specific type of service requested, such as service for a battery problem. Based on the location of the mobile device, the server identifies nearby retail service centers and may communicate with service center computers at each of the retail service centers to estimate the wait time for service at each of the retail service centers. The estimated wait times may be based on the number of waiting customers at each of the retail service centers and the types of service that each customer has requested. If the mobile device user identifies the specific type of service requested, the server identifies only the nearby retail service centers that provide that type of service. The server may also identify retail service centers based on other factors, such as customer satisfaction ratings and whether a retail service center is directly operated by the service provider for the mobile device. Then the server sends the mobile device the estimated wait time and location for each of the retail service centers, which may be sent in the form of a map. The mobile device user may not be aware of the location of some nearby retail service centers until the server provides this information. The mobile device user may review the wait times at each of the nearby centers to select the center with the shortest waiting time, thereby reducing customer frustration.

The server also may also estimate the time to travel from the current location of the mobile device to each of the retail service centers and provide these travel times to the mobile device. The server may instruct the mobile device to highlight optimized choices from the displayed options for service. For example, the optimized choices may determine a projected minimum service cycle time that takes into account both the travel time to the retail service center in combination with the projected wait time at that retail service center. A mobile device user may use the travel information combined with the wait information to determine which retail service center may begin servicing the mobile device the most quickly. If the wait time for each of the centers and/or the travel times to each of the centers is too long, the server may expand the list of possible options by providing the mobile device with similar information for additional nearby retail service centers. The server also may provide the mobile device with self help actions that the user may take to eliminate the need for mobile device service. Successful self help actions may enhance the customer experience. If the mobile device user selects a retail service center, the server may add the requested service to the waiting list at the selected retail service center before the mobile device arrives at the selected retail service center. Being added to a waiting list in advance may increase customer satisfaction. Additionally, the server may report any unsuccessful self help actions to the selected retail service center to update customer service representatives in advance, or approximate retail service center savings based on any successful self help actions. Updated customer service representatives may not have to repeat the same actions that the mobile device user already took, which may result in completing the mobile device service sooner, which also may increase customer satisfaction.

FIG. 1 shows a wireless communications system 100 that is suitable for implementing several embodiments of the disclosure. The wireless communication system 100 includes an illustrative mobile device 102. Though illustrated as a mobile phone, the mobile device 102 may take various forms including a mobile telecommunication device, a mobile handset, a personal digital assistant (PDA), a mobile computer, a handheld gaming device, a wireless mobile device, a pager, a portable computer, a tablet computer, a laptop computer, a digital camera, a digital music player, and a digital calculator. Suitable devices may combine some or all of these functions. In some embodiments, the mobile device may be a mobile phone with a media player that can play audio and video.

The mobile device 102 includes a display 104 and a touch-sensitive surface or keys 106 with which the user can also interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. Among the various applications executable by the mobile device 102 are a media player which may enable the mobile device 102 to request mobile device service and receive information related to mobile device service. These applications may configure the mobile device 102 to perform various customized functions in response to user interaction.

The mobile device 102 may communicate via wireless communications with a base transceiver station (BTS) 108, a wireless network access node, or another wireless communications network or system. The base transceiver station 108 (or wireless network access node) is coupled via to a telecommunication network 110, such as the Internet. While one base transceiver station 108 is shown in FIG. 1, other base transceiver stations could be present. Via the wireless link and the network 110, the mobile device 102 may have access to various servers, such as a communication server 112.

The mobile device 102 may communicate with the base transceiver station 108 by a standard wireless telephony protocol (such as code division multiple access (CDMA), global system for mobile communication (GSM), universal mobile telecommunications system (UMTS), and worldwide interoperability for microwave access (WiMAX)), a wireless internet connection, or some other means of wireless communication.

The system 100 also includes a first retail service center 114, a second retail service center 116, and a third retail service center 118, where the mobile device user may take the mobile device 102 for mobile device service. The first retail service center 114 includes a first service center computer 120, the second retail service center 116 includes a second service center computer 122, and the third retail service center 118 includes a third service center computer 124. Although each of the retail service centers 114-118 is depicted as having one of the service center computers 120-124, each of the retail service centers 114-118 may have many of the service center computers 120-124, wherein each of the service center computers 120-124 provides different functions and capabilities. For example, the first retail service center 114 may have one of the service center computers 120-124 to log and track customers and another of the service center computers 120-124 to maintain wait lists and to estimate a corresponding wait time and a service time for mobile device service at the first retail service center 114. Although depicted separately, the functions and capabilities of the service center computers 120-124 may be combined together into a fewer number of service center computers 120-124 and/or incorporated in the communication server 112.

Additionally, the system 100 includes a data store 126 that may store information related to the locations of the retail service centers 114-118, estimated wait times at the retail service centers 114-118, estimated repair times, self-help information associated with various types of mobile device service, and logged times for each request, arrival, service, and completion. Although depicted separately, the functions and capabilities of the data store 126 may be incorporated in any combination of the service center computers 120-124 and/or the communication server 112. The communication server 112 and the service center computers 120-124 may be provided by a general purpose computer, which is discussed later.

Figures 2, 3:
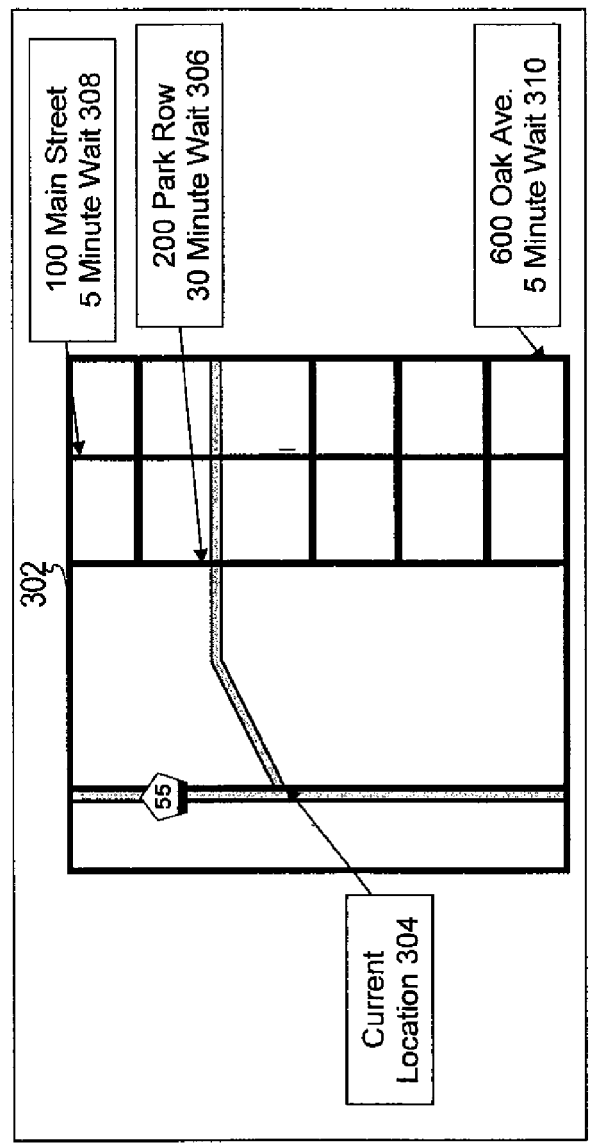
FIG. 2 shows a frame of a graphic user interface for intelligent service traffic management according to some embodiments of the present disclosure.
FIG. 3 shows a frame of another graphic user interface for intelligent service traffic management according to some embodiments of the present disclosure.

FIG. 2 is a frame 200 of a graphic user interface for intelligent service traffic management according to some embodiments of the present disclosure. The numbers and types of each column and each row in FIG. 2 are depicted for the purpose of an illustrative example, as the frame 200 can include any number and type of columns and rows. The frame 200 includes columns for a retail service center location 202, an estimated travel time 204, an estimated wait time 206, an estimated time until service 208, an estimated service time 210, and an estimated return time 212. The frame 200 also includes a first data row 214, a second data row 216, and a third data row 218. Additionally, the graphic user interface may contain other frames and control elements. The communication server 112 may respond to a request from the mobile device 102 for mobile device service by providing the frame 200 to the mobile device 102, which may display the frame 200 via the display 104.

For example, when the mobile device 102 requests mobile device service, the communication server 112 responds by providing the frame 200, which indicates street address of the retail service centers 114-118 in the retail service center location column 202. Continuing this example, the first row 214 of the estimated travel time 204 column indicates that the communication server 112 estimates that 15 minutes of travel time may be required to take the mobile device 102 from its current location to the retail service center located at 100 Main Street. Further to this example, the first row 214 of the estimated wait time 206 column indicates that the communication server 112 estimates that 5 minutes of waiting time may be required while the retail service center located at 100 Main Street services other customers before that retail service center may service the mobile device 102. Combining these examples, the first row 214 of the estimated time until service 208 column indicates that the communication server 112 estimates that the retail service center located at 100 Main Street may be able to begin to service the mobile device 102 in 20 minutes, which combines the 15 minutes of travel time and the 5 minutes of wait time. As another example, the first row 214 of the estimated service time 210 column indicates that the communication server 112 estimates that the requested mobile device service may take 65 minutes. As yet another example, the first row 214 of the estimated return time 212 column indicates that the communication server 112 estimates that taking the mobile device 102 to the retail service center located at 100 Main Street, waiting, and servicing the mobile device 102 may require a total of 85 minutes, or 15 minutes of travel time combined with 5 minutes of wait time and 65 minutes of service time.

FIG. 3 is a frame 300 of another graphic user interface for intelligent service traffic management according to some embodiments of the present disclosure. The numbers and types of each element in FIG. 3 are depicted for the purpose of an illustrative example, as the frame 300 can include other numbers and type of elements. The frame 300 includes a map 302, an element for a current location 304 of the mobile device 102, and elements 306-310 for the retail service centers 114-118. Additionally, the graphic user interface may contain other frames and control elements. The communication server 112 may respond to a request from the mobile device 102 for mobile device service by providing the frame 300 to the mobile device 102, which may display the frame 300 via the display 104. The elements 306-310 may display information associated with each of the retail service centers 114-118.

For example, the element 306 for the retail service center located at 600 Oak Ave. may indicate a 5 minute wait before that retail service center may service the mobile device 102. The map 302 may enable the user of the mobile device 102 to approximate the travel time from the current location 304 of the mobile device 102 to any of the retail service centers 114-118 represented by the elements 306-310. For example, the map 302 may enable the user to determine that the retail service center located at 200 Park Row, depicted by the element 306, is geographically the closest to the current location 304 of the mobile device 102. Additionally, the map 302 may enable the user to select the retail service center located at 100 Main Street for mobile device service because the user may also run an errand at a nearby store while the mobile device 102 is being serviced.

Figure 4:
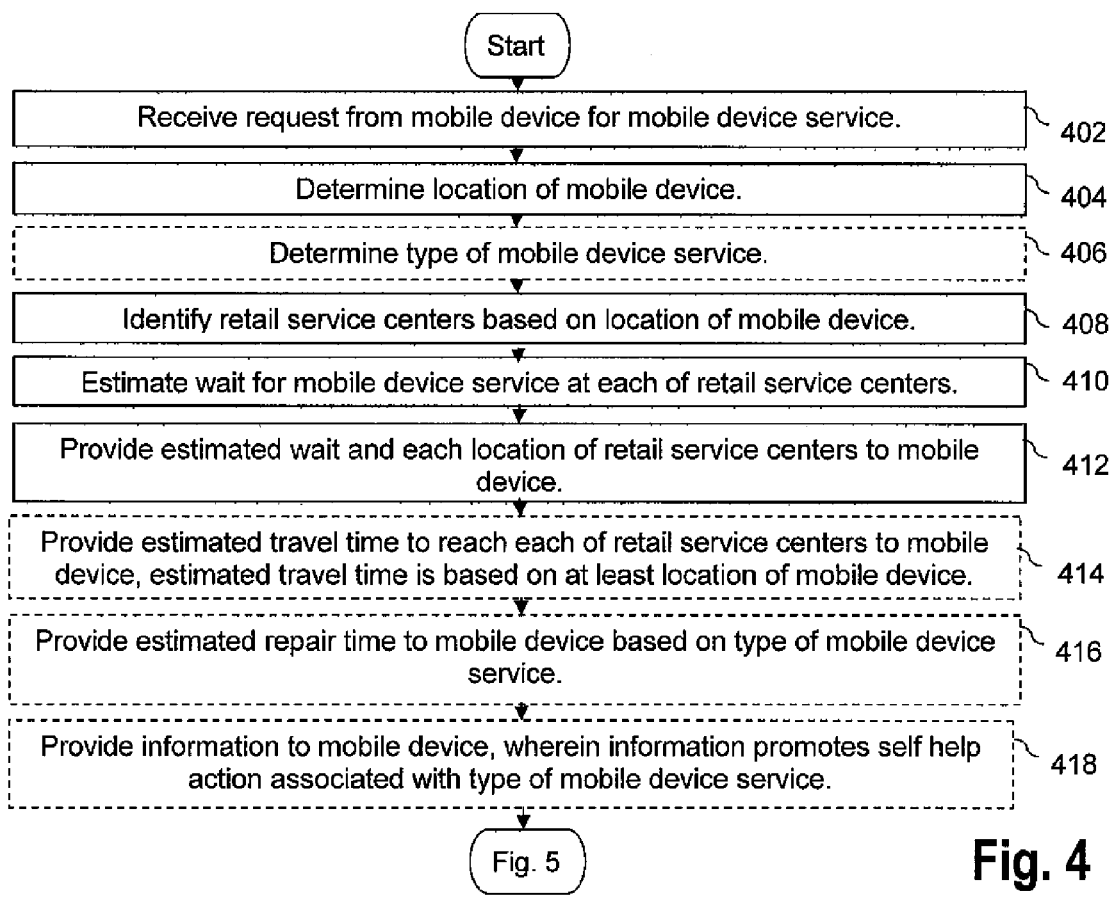
FIG. 4 shows a first portion of a flowchart of a method for intelligent service traffic management according to some embodiments of the present disclosure.

FIG. 4 is a first portion of a flowchart of a method for intelligent service traffic management according to some embodiments of the present disclosure. The communication server 112 may execute the method to provide estimated wait times and locations of retail service centers to the mobile device 102 in response to a request for mobile device service.

In box 402, a request is received from a mobile device for mobile device service. For example, in response to problems with the battery for the mobile device 102, the mobile device user uses the keys 106 to request mobile device service, where the request is received by the communication server 112.

In box 404, a location of the mobile device is determined. For example, the communication server 112 determines a location of the mobile device 102 by executing a location determination method such as for cell towers, cell sector centroids, advanced forward link trilateration, a global positioning system, and/or a hybrid location fix technology, or others for example.

In box 406, a type of mobile device service is optionally determined. For example, the communication server 112 determines a type of mobile device service by providing a list of types of mobile device services to the mobile device 102 and receiving a selection of the type of mobile device service from the mobile device 102. The list of types of mobile device services may be based on recent mobile device problems. For example, the list of mobile device services displayed via the display 104 may include a camera option, a short message service option, a digital picture messages option, a voice call option, and a phonebook option. In response to the selection of the camera option, the display 104 may display further options, such as a resolution option, a flash option, a zoom option, and a shutter sound option. The communication server 112 may receive the selection of the flash option for the camera option. The communication server 112 may also determine a type or model of the mobile device 110.

In box 408, a plurality of retail service centers is identified based on the location of the mobile device. For example, the communication server 112 identifies the retail service centers associated with the elements 306-310 based on the current location 304 of the mobile device 102, as depicted by the map 302 in FIG. 3. If the mobile device user has requested a specific type of mobile device service, such as for a battery problem, the communication server 112 may identify only the nearby retail service centers that provide the type of mobile device service requested.

In box 410, a wait for the mobile device service is estimated at each of the retail service centers. For example, the communication server 112 may communicate with the service center computers 120-124 to obtain customer wait list, wait time, and service time information from each store and use it to determine or estimate a wait for the mobile device service at each of the retail service centers 114-118, as depicted by the estimated wait time 206 column in FIG. 2. In addition to estimating a wait for any type of mobile device service, the communication server 112 also may communicate with the service center computers to estimate a wait for the requested type of mobile device service at each of the retail service centers 114-118. For example, if the third retail service center 118 does not provide the requested type of mobile device service, the communication server 112 may communicate with the service center computers to estimate a wait for the requested type of mobile device service at each of the remaining retail service centers 114 and 116. The estimated wait may be based on a combination of a number of waiting customers and each type of mobile device service associated with the number of waiting customers. This information may be obtained from the service center computers 120-124 at the retail service centers 114-118. For example, the estimated wait time 206 for the retail service center located at 100 Main Street may be 5 minutes, as depicted by the first row 214, based on two waiting customers with types of mobile device service that do not require significant amounts of service time. In another example, the estimated wait time 206 for the retail service center located at 200 Park Row may be 30 minutes, as depicted by the second row 216, based on only one waiting customer with a type of mobile device service that requires a significant amount of service time. The wait time may also be based on the number of customer service representatives working at each retail service center, and their historically measured productivity rates.

In box 412, the estimated wait and each location of the retail service centers are provided to the mobile device. For example, the communication server 112 provides the estimated wait and each location of the retail service centers 114-118 to the mobile device 102, as depicted by the frame 200 in FIG. 2. The communication server 112 may provide the estimated wait and each location of the retail service centers to the mobile device 102 based on the map 302 in FIG. 3.

In box 414, an estimated travel time to reach each of the retail service centers are optionally provided to the mobile device, wherein the estimated travel time is based on at least the location of the mobile device. For example, the communication server 112 provides the estimated travel time 204 column to the mobile device 102, wherein the estimated travel time 204 for each of the retail service centers 114-118 is based on the location of the mobile device 102, such as the current location 304 relative to the location of the retail service centers depicted by the elements 306-310 in FIG. 3, current road traffic conditions, and a constructive analysis of current road traffic conditions.

In box 416, an estimated repair time is optionally provided to the mobile device based on the type of mobile device service, and/or the type or model of the mobile device. For example, the communication server 112 provides the estimated service time 210 column depicted in FIG. 2 to the mobile device 102 based on the battery service. The estimated repair time also may specify an estimated repair cost, which may be based on information from the customer's service plan, such as insurance information or warranty information, which is retrieved by the communication server 112.

In an embodiment, a name of the user of the mobile device 102 may be placed on a waiting list at a selected one of the retail service centers 114-118. If wait time is fifteen minutes at the selected one of the retail service centers 114-118 and if the travel time to the selected one of the retail service centers 114-118 is ten minutes, the net wait time may be only five minutes. In an embodiment, the net wait time may be displayed by the mobile device 102.

In box 418, information is optionally provided to the mobile device, wherein the information promotes a self help action associated with the type of mobile device service. For example, the communication server 112 provides self help information for battery problems to the mobile device 102, which displays the information via the display 104. The mobile device user may respond to the displayed self help information by taking a self help action associated with the type of mobile device service requested. For example, the mobile device user may take self help actions displayed via the display 104 to attempt to correct the battery problem. The self help action may be based on a solution to a recent mobile device problem. For example, the communication server 112 may track recently reported mobile device problems and any corresponding self help actions to provide current solutions to recent mobile device problems. The method continues to box 420 in FIG. 5.

Figure 5:
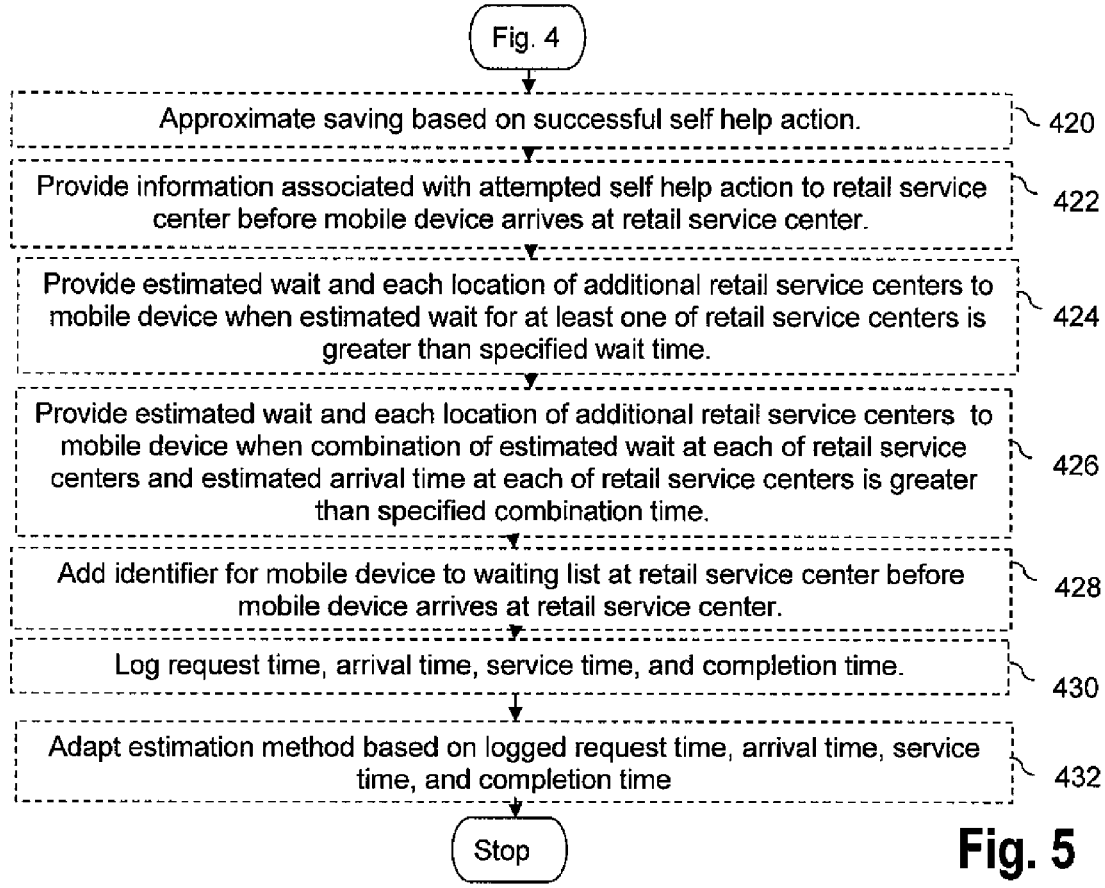
FIG. 5 shows a second portion of the flowchart of the method for intelligent service traffic management according to some embodiments of the present disclosure.

FIG. 5 shows a second portion of the flowchart of the method for intelligent service traffic management according to some embodiments of the present disclosure. In box 420, a saving is optionally approximated based on a successful self help action. For example, the mobile device user uses the keys 106 to report a successful self help action for the battery problem. In response, the communication server 112 approximates a saving of 15 minutes for the closest retail service center based on a historical average of 15 minutes required for mobile device service associated with battery problems. The approximated savings may be used to justify support of expenses incurred for providing information that promote self help actions to mobile devices.

In box 422, information associated with an attempted self help action is optionally provided to a retail service center before the mobile device 102 arrives at the retail service center. For example, the mobile device user uses the keys 106 to indicate that the attempted self help for the battery problem was unsuccessful and to select the second retail service center 116 for the battery service. The communication server 112 responds by reporting the unsuccessful self help action for the battery problem to the second retail service center 116 before the mobile device 102 arrives at the second retail service center 116. In this example, a customer service representative at the second retail service center 116 is already aware of the unsuccessful self help action for the battery problem before the mobile device 102 arrives at the second retail service center 116.

In box 424, the estimated wait and each location of a plurality of additional retail service centers is optionally provided to the mobile device when the estimated wait for at least one of the retail service centers is greater than a specified wait time. For example, the communication server 112 provides the estimated waits and locations of three additional retail service centers to the mobile device 102 because the estimated wait for the retail service center located at 200 Park Row is 30 minutes, as depicted by the second row 216, which is greater than a specified wait time of 20 minutes.

In box 426, the estimated wait and each location of a plurality of additional retail service centers is optionally provided to the mobile device when a combination of the estimated wait at each of the retail service centers and an estimated arrival time at each of the retail service centers is greater than a specified combination time. For example, the communication server 112 provides the estimated waits and locations of two additional retail service centers to the mobile device 102 because the combination of estimated wait time and arrival time for the retail service center located at 600 Oak Ave. is 50 minutes, as depicted by the third row 218, which greater than a specified combination time of 45 minutes.

In box 428, an identifier for the mobile device is optionally added to a waiting list at a retail service center before the mobile device arrives at the retail service center. For example, in response to the mobile device user using the keys 106 to select the first retail service center 114, the communication server 112 adds an identifier for the mobile device 102 to a waiting list at the first retail service center 114 before the mobile device 102 arrives at the first retail service center 114. The communication server 112 may also provide information about the customer's service request, such as attempted self help actions, to the first retail service center 114 to automatically initiate a specific service request process on behalf of the customer. In an embodiment, the first retail service center 114, or other retail service center, may map the customer's service request to a predetermined problem code and/or symptom code which the first retail service center 114 may use to initiate a trouble ticket on behalf of the customer.

In box 430, a request time, an arrival time, a wait time, a service time, and a completion time are optionally logged. For example, the communication server 112 logs the time when the mobile device 102 requested battery service, when the mobile device 102 arrived at the first retail service center 114, when service began on the mobile device 102 at the first retail service center 114, and when service completed on the mobile device 102 at the first retail service center 114.

In box 432, estimation methods are optionally adapted based on logged request time, arrival time, service time, and completion time. For example, the communication server 112 uses the logged wait times at the first retail service center 114 to provide a more accurate estimate of the wait times at the first retail service center 114 to mobile devices 102 when subsequent requests are made for mobile device service at the first retail service center 114. The adaptation of the estimation methods may promote adjusting for variations in handling times associated with seasonal variations and/or staffing turn-over variations as well as other variations. Adaptation may be over longer time periods or shorter time periods. The adaptation technique may generally be based on a damped or time lagged feedback loop.

Figure 6:
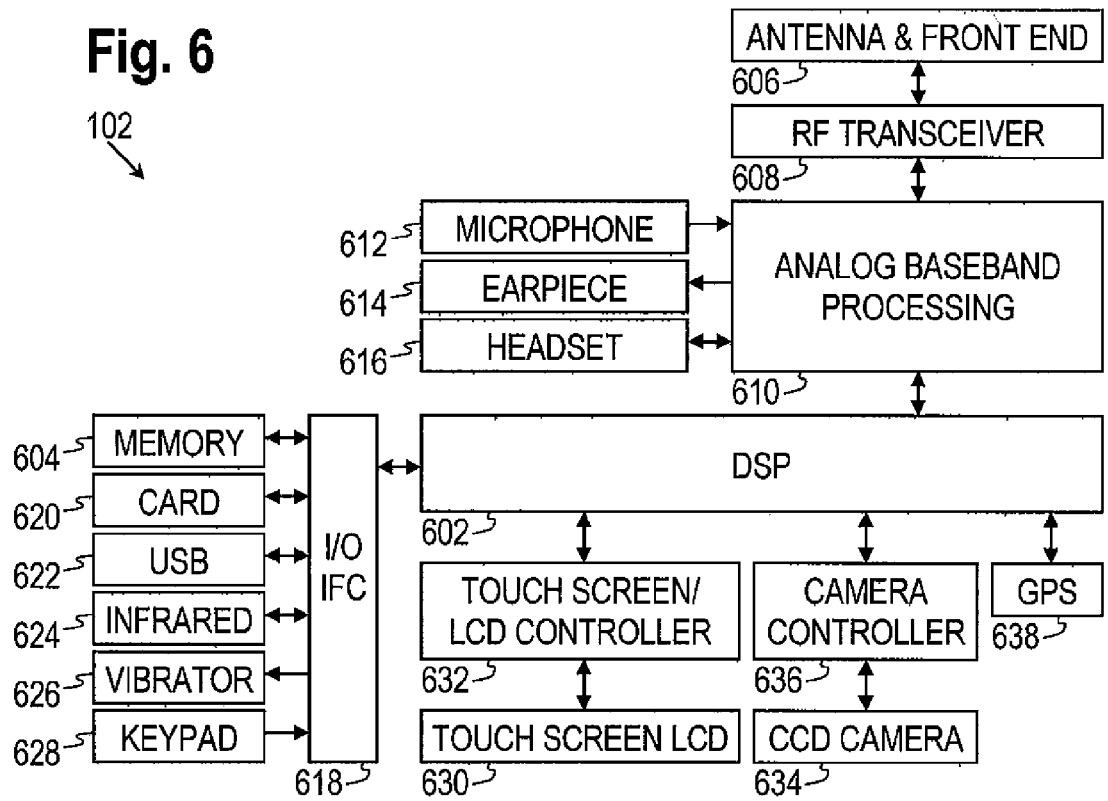
FIG. 6 shows a block diagram of an illustrative mobile device.

FIG. 6 shows a block diagram of the mobile device or handset 102. While a variety of known components of mobile devices 102 are depicted, in an embodiment a subset of the listed components and/or additional components not listed may be included in the mobile device 102. The mobile device 102 includes a digital signal processor (DSP) 602 and a memory 604. As shown, the mobile device 102 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a charge-coupled device (CCD) camera 634, a camera controller 636, and a global positioning system (GPS) sensor 638. In an embodiment, the mobile device 102 may include another kind of display that does not provide a touch sensitive screen. In an embodiment, the DSP 602 may communicate directly with the memory 604 without passing through the input/output interface 618.

The DSP 602 or some other form of controller or central processing unit operates to control the various components of the mobile device 102 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the mobile device 102 to send and receive information from a cellular network or some other available wireless communications network or from a peer mobile device 102. In an embodiment, the antenna and front end unit 606 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 606 may include antenna tuning and/or impedance matching components, RF power amplifiers, and/or low noise amplifiers.

The RF transceiver 608 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 610 and/or the DSP 602 or other central processing unit. In some embodiments, the RF transceiver 608, portions of the antenna and front end 606, and the analog baseband processing unit 610 may be combined in one or more processing units and/or application specific integrated circuits (ASICs).

The analog baseband processing unit 610 may provide various analog processing of inputs and outputs, for example analog processing of inputs from the microphone 612 and the headset port 616 and outputs to the earpiece speaker 614 and the headset port 616. To that end, the analog baseband processing unit 610 may have ports for connecting to the built-in microphone 612 and the earpiece speaker 614 that enable the mobile device 102 to be used as a cell phone. The analog baseband processing unit 610 may further include a port for connecting to a headset or other hands-free microphone and speaker configuration. The analog baseband processing unit 610 may provide digital-to-analog conversion in one signal direction and analog-to-digital conversion in the opposing signal direction. In some embodiments, at least some of the functionality of the analog baseband processing unit 610 may be provided by digital processing components, for example by the DSP 602 or by other central processing units.

The DSP 602 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 602 may perform modulation, coding, interleaving, and spreading, and for a receiver function the DSP 602 may perform despreading, deinterleaving, decoding, and demodulation. In another embodiment, for example in an orthogonal frequency division multiplex access (OFDMA) technology application, for the transmitter function the DSP 602 may perform modulation, coding, interleaving, inverse fast fourier transforming, and cyclic prefix appending, and for a receiver function the DSP 602 may perform cyclic prefix removal, fast fourier transforming, deinterleaving, decoding, and demodulation. In other wireless technology applications, yet other signal processing functions and combinations of signal processing functions may be performed by the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 102 to function as a peripheral device to exchange information with a personal computer or other computer system. The infrared port 624 and other optional ports such as a Bluetooth interface or an IEEE 802.11 compliant wireless interface may enable the mobile device 102 to communicate wirelessly with other nearby mobile devices and/or wireless base stations.

The input/output interface 618 may further connect the DSP 602 to the vibrator 626 that, when triggered, causes the mobile device 102 to vibrate. The vibrator 626 may serve as a mechanism for silently alerting the user to any of various events such as an incoming call, a new text message, and an appointment reminder.

The keypad 628 couples to the DSP 602 via the input/output interface 618 to provide one mechanism for the user to make selections, enter information, and otherwise provide input to the mobile device 102. Another input mechanism may be the touch screen LCD 630, which may also display text and/or graphics to the user. The touch screen LCD controller 632 couples the DSP 602 to the touch screen LCD 630.

The CCD camera 634 enables the mobile device 102 to take digital pictures. The DSP 602 communicates with the CCD camera 634 via the camera controller 636. The GPS sensor 638 is coupled to the DSP 602 to decode global positioning system signals, thereby enabling the mobile device 102 to determine its position. In another embodiment, a camera operating according to a technology other than Charge Coupled Device cameras may be employed. Various other peripherals may also be included to provide additional functions, e.g., radio and television reception.

Figure 7:
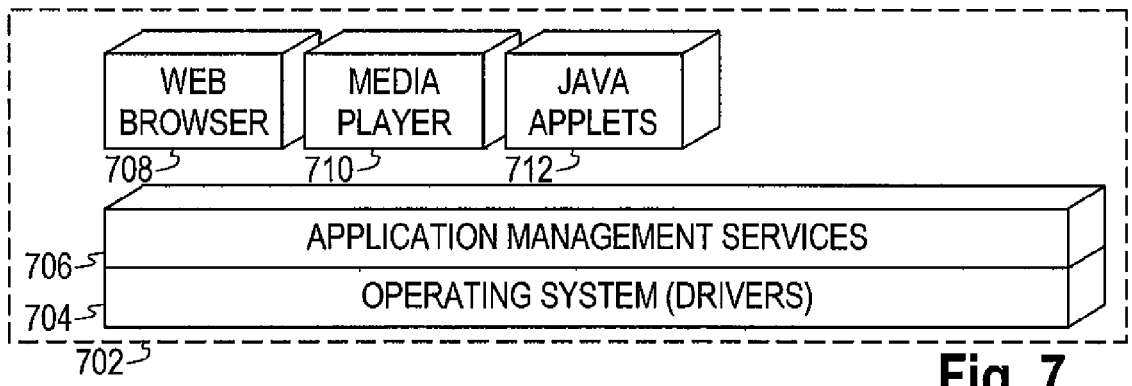
FIG. 7 shows a block diagram of an illustrative software configuration for a mobile device.

FIG. 7 illustrates a software environment 702 that may be implemented by the DSP 602. The DSP 602 executes operating system drivers 704 that provide a platform from which the rest of the software operates. The operating system drivers 704 provide drivers for the mobile device hardware with standardized interfaces that are accessible to application software. The operating system drivers 704 include application management services ("AMS") 706 that transfer control between applications running on the mobile device 102. Also shown in FIG. 7 are a web browser application 708, a media player application 710, and JAVA applets 712. The web browser application 708 configures the mobile device 102 to operate as a web browser, allowing a user to enter information into forms and select links to retrieve and view web pages. The media player application 710 configures the mobile device 102 to retrieve and play audio or audiovisual media. The JAVA applets 712 configure the mobile device 102 to provide games, utilities, and other functionality.

Figure 8:
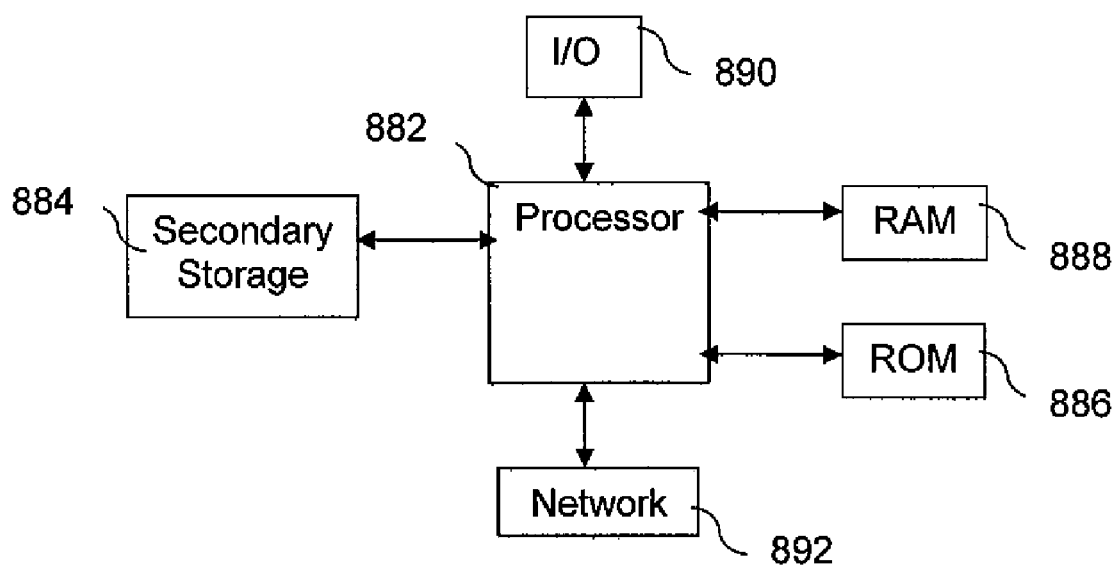
FIG. 8 illustrates an exemplary general purpose computer system suitable for implementing the several embodiments of the disclosure.

Portions of the system 100 described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor may be implemented as one or more CPU chips.

The secondary storage 884 is typically comprised of one or more disk drives or tape drives and is used for non-volatile storage of data and as an over-flow data storage device if the RAM 888 is not large enough to hold all working data. Secondary storage 884 may be used to store programs which are loaded into the RAM 888 when such programs are selected for execution. The ROM 886 is used to store instructions and perhaps data which are read during program execution. The ROM 886 is a non-volatile memory device which typically has a small memory capacity relative to the larger memory capacity of secondary storage. The RAM 888 is used to store volatile data and perhaps to store instructions. Access to both the ROM 886 and the RAM 888 is typically faster than to the secondary storage 884.

The I/O devices 890 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), worldwide interoperability for microwave access (WiMAX), and/or global system for mobile communications (GSM) radio transceiver cards, and other well-known network devices. These network connectivity devices 892 may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using the processor 882, may be received from and outputted to the network, for example, in the form of a computer data signal embodied in a carrier wave.

Such information, which may include data or instructions to be executed using the processor 882 for example, may be received from and outputted to the network, for example, in the form of a computer data baseband signal or signal embodied in a carrier wave. The baseband signal or signal embodied in the carrier wave generated by the network connectivity devices 892 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts which it accesses from hard disk, floppy disk, optical disk (these various disk based systems may all be considered the secondary storage 884), the ROM 886, the RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for guiding a mobile device user to optionally select a mobile device service retail service center comprising:
   receiving a request from a mobile device for mobile device service;
   determining a location of the mobile device;
   identifying one or more retail service centers for servicing a mobile device based on the location of the mobile device;
   estimating a wait for the mobile device service at each of the retail service centers;
   providing the estimated wait and each location of the retail service centers to the mobile device;
   providing a net wait time at each of the retail service centers to the mobile device to guide a user of the mobile device to optionally select a retail service center, the net wait time being calculated by subtracting a travel time to a corresponding retail service center from the estimated wait at the corresponding retail service center,
   wherein each of the receiving a request, determining a location, identifying one or more retail service centers, estimating a wait, and providing the estimated wait and each location occur prior to optionally selecting a retail service center.

2. The computer implemented method of claim 1, further comprising providing an estimated travel time to reach each of the retail service centers to the mobile device, wherein the estimated travel time is based on at least the location of the mobile device.

3. The computer implemented method of claim 1, further comprising adding an identifier for the mobile device to a waiting list at a retail service center before the mobile device arrives at the retail service center.

4. The computer implemented method of claim 1, further comprising adapting estimation methods based on a logged request time, arrival time, service time, and completion time.

5. The computer implemented method of claim 1, wherein the estimated wait is based on a combination of a number of waiting customers and each type of mobile device service associated with the number of waiting customers.

6. The computer implemented method of claim 1, further comprising:
   selecting one of the retail service centers.

7. A system for guiding a mobile device user to optionally select a mobile device service retail service center, comprising:
   a plurality of service center computers, wherein each of the service centers computers is associated with one or more retail service centers;
   a server configured to receive a request from a mobile device for mobile device service, determine a location of the mobile device, to identify a plurality of retail service centers based on the location of the mobile device, to communicate with the service center computers to estimate a wait for the mobile device service at each of the retail service centers, to provide the estimated wait and location of each of the plurality of retail service centers to the mobile device, to provide a net wait time at each of the retail service centers to the mobile device to guide a user of the mobile device to optionally select a retail service center, the net wait time being calculated by subtracting a travel time to a corresponding retail service center from the estimated wait at the corresponding retail service center, to receive a request from the mobile device to add the requested mobile device service to a waiting list, and to add the requested mobile device service to a waiting list.

8. The system of claim 7 wherein the mobile device is one of a mobile telecommunication device, a mobile handset, a personal digital assistant, a mobile computer, a handheld gaming device, a wireless mobile device, a pager, a portable computer, a tablet computer, a laptop computer, a digital camera, a digital music player, and a digital calculator.

9. The system of claim 7, wherein the server provides the estimated wait and each location of the retail service centers to the mobile device by listing the estimated wait and each location based on at least one of the estimated wait associated with the retail service centers, each proximity of the retail service centers, and a combination of the estimated wait at each of the retail service centers and an estimated arrival time at each of the retail service centers.

10. The system of claim 7, wherein the server provides the estimated wait and each location of the retail service centers to the mobile device based on a map of each location of the retail service centers.

11. The system of claim 7, wherein the server is further configured to provide the estimated wait and each location of a plurality of additional retail service centers to the mobile device when the estimated wait for at least one of the retail service centers is greater than a specified wait time.

12. The system of claim 7, wherein the server is further configured to provide the estimated wait and each location of a plurality of additional retail service centers to the mobile device when a combination of the estimated wait at each of the retail service centers and an estimated arrival time at each of the retail service centers is greater than a specified combination time.

13. A computer implemented method for guiding a mobile device user to select a mobile device service retail service center, comprising:
   receiving a request from a mobile device for mobile device service;
   determining a location of the mobile device;
   determining a type of mobile device service;
   identifying a plurality of service centers that provide the type of mobile device service based on the location of the mobile device;

estimating a wait for the type of mobile device service at each of the plurality of retail service centers;

providing the estimated wait and each location of the retail service centers to the mobile device;

providing a net wait time at each of the retail service centers to the mobile device to guide a user of the mobile device to select a retail service center, the net wait time being calculated by subtracting a travel time to a corresponding retail service center from the estimated wait at the corresponding retail service center;

receiving a request from the mobile device to add the requested mobile device service to a waiting list of a selected retail service center;

adding the requested mobile device service to the waiting list of the selected retail service center.

14. The computer implemented method of claim 13, further comprising providing an estimated repair time to the mobile device based on at least one of the type of mobile device service and a type of the mobile device.

15. The computer implemented method of claim 13, wherein determining a type of mobile device service comprises providing a list of types of mobile device services to the mobile device and receiving a selection of the type of mobile device service from the mobile device.

16. The computer implemented method of claim 15, wherein the list of types of mobile device services is based on recent mobile device problems.

17. The computer implemented method of claim 13, further comprising providing information associated with an attempted self help action to a retail service center before the mobile device arrives at the retail service center.

18. The computer implemented method of claim 17, further comprising approximating a saving based on a successful self help action.

19. The computer implemented method of claim 13, further comprising:

providing information to the mobile device, wherein the information promotes a self help action associated with the type of mobile device service.

* * * * *